Aug. 26, 1924.
M. M. LARSEN
1,506,492
LICENSE PLATE AND HOLDER
Filed Sept. 25, 1923
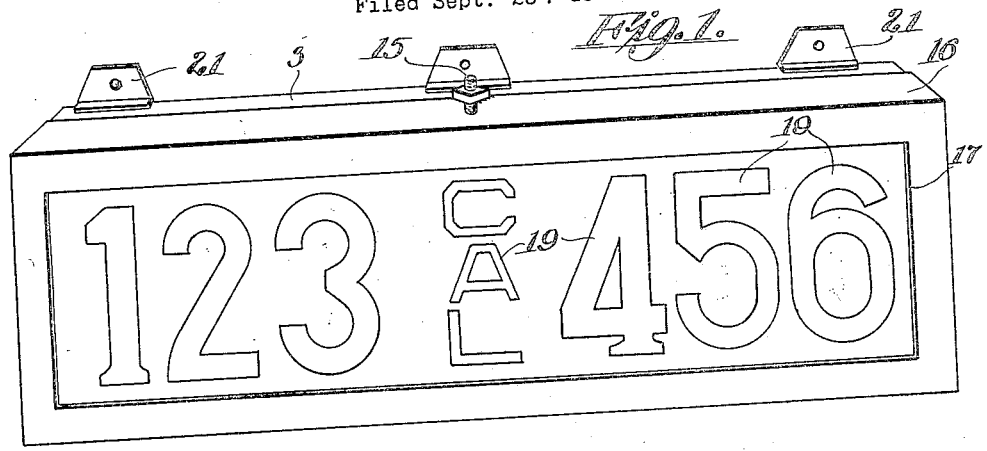
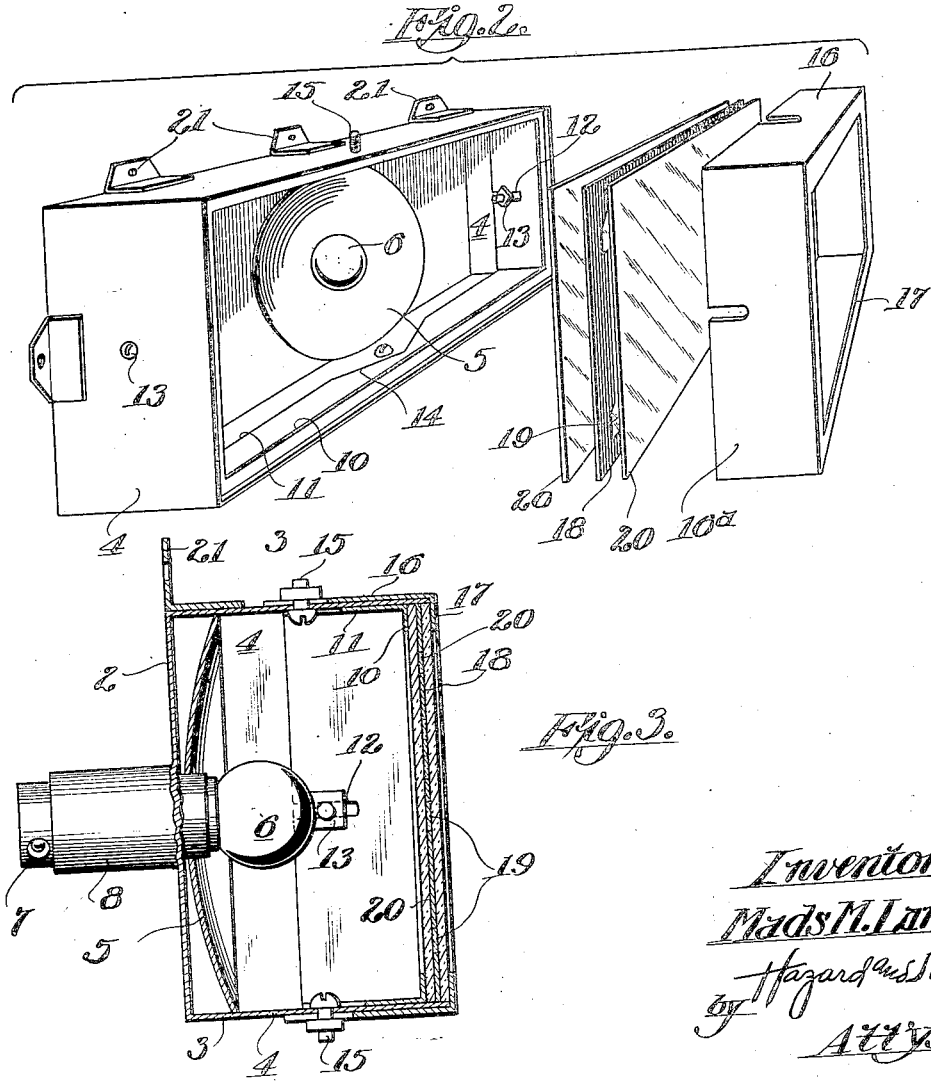
Inventor
Mads M. Larsen
by Hazard and Miller
Att'ys Patented Aug. 26, 1924.

UNITED STATES PATENT OFFICE.

MADS M. LARSEN, OF COLTON, CALIFORNIA.

LICENSE PLATE AND HOLDER.

Application filed September 25, 1923. Serial No. 664,701.

*To all whom it may concern:*

Be it known that I, MADS M. LARSEN, a citizen of the United States, residing at Colton, in the county of San Bernardino and State of California, have invented new and useful Improvements in License Plates and Holders, of which the following is a specification.

This invention relates to automobile and other road vehicle accessories, and more particularly to a license plate and holder.

An object is to provide an extremely simple, practicable and substantial illuminating license plate holder. Another object is to provide a license plate which is effective both for day and night use in the conspicuous display of the number and State which is to be indicated by the license plate.

Other objects and advantages will be made manifest in the following specification of an embodiment of the invention illustrated in the accompanying drawings, wherein:

Figure 1 is a perspective of the device assembled.

Fig. 2 is a perspective showing the parts separated and arranged in the order of their assembly.

Fig. 3 is a vertical, transverse section from front to rear of the device.

The holder forming a part of the present invention consists of an elongated box including a back wall 2 and longitudinal walls 3 and end walls 4. While the box is shown substantially of oblong form, it is understood that the general outline may be varied if so desired.

Mounted in the back of the box is any suitable reflector 5, in front of which is an electric bulb 6 mounted in a socket 7 secured in a rearwardly extending sleeve 8 on the back 2 of the box.

Telescopically fitted within the front of the box is an inside frame including a perpendicular flange 10 and a lateral flange or frame part 11 sliding and fitting in the walls of the box. The sliding flanges are slotted in their end portions at 12 to receive a screw or bolt 13 passing through the end walls 4 of the box, and whereby the inside frame may be fixedly set at the desired position.

The top and bottom flanges 11 of the sliding inside frame are cut away at 14. These cut-away portions provide clearance for upper and lower fastening bolts 15 which are received in slotted top and bottom flanges 16 of an outside and front frame device slidably adjustable upon the outside surfaces of the walls of the box. The outside frame has end walls 16ª and a perpendicular or forwardly extending marginal flange frame 17. The outside frame is adapted to be telescoped onto the box and fastened in position by the screws or bolts 15.

The license indicating member consists of a plate 18 having an opaque portion and having translucent portions 19 embodying the numerals and the State letters, as clearly shown in Figure 1. The opaque portion of the plate 18 may be of any suitable color to contrast with the translucent portions 19. The plate 18 may be made of any suitable material, for instance glass or celluloid, and is supported at the front and rear by clear plates 20, as of glass.

The inner glass plate 20 is set against the flange 10 of the inner frame; then the license plate 18 is inserted and then the outer glass or transparent member 20 is inserted and followed by the retaining outer frame 17.

From the above it will be seen that I have provided an extremely simple and inexpensive and yet highly effective and durable license plate device.

The holder is adapted to be secured to any primary supporting parts, as for instance by screws or bolts passing through lugs 21 provided at suitable locations on the box proper.

Further embodiments, modifications and variations may be resorted to within the principle of the invention.

What is claimed is:

1. A license plate device comprising, in combination, a box, inner and outer supporting frames adjustably mounted upon the box and having inwardly extending flange portions, a license plate supported between the said flange portions, and means in the box for effecting an illumination of the license plate to render the characters thereon conspicuous.

2. A license plate holder comprising a box, a frame telescopically mounted in the box and having inwardly extending flanges, an outside frame slidably mounted on the box and having inwardly extending flanges, whereby a license plate may be supported between the said flanges of the frames, and means for adjustably securing both of said frames in position with respect to the box independently of each other.

3. A license plate holder comprising an elongated box including a back wall, longitudinal upper and lower walls and end walls, a reflector mounted in the box against the back, a lamp socket extending through the back and reflector, an inside frame fitting closely in the box and having an inturned flange, a glass fitting against the flange, a license plate fitting against the glass, a second glass fitting against the license plate, an outside frame fitting upon the box and having an inturned flange to engage the second glass.

4. A license plate holder comprising a rectangular box open at one side, an inside frame fitting in the box and having an inturned flange and having parallel slots from its inner edge, bolts inserted through the slots and through the box to hold the inside flange adjustably in position, a glass fitting against the flange, a license plate fitting against the glass, a second glass fitting against the license plate, an outside frame fitting tightly upon the box and having an inturned flange to engage the second glass, there being slots formed in said outside frame and bolts inserted through the box and through the slots to hold the outside frame adjustably in position.

In testimony whereof I have signed my name to this specification.

MADS M. LARSEN.